D. KUNKEL.
Blacksmiths' Tongs.

No. 153,001. Patented July 14, 1874.

WITNESSES:
E. Wolff
*(signature)*

INVENTOR:
D. Kunkel
BY *(signature)*
ATTORNEYS.

UNITED STATES PATENT OFFICE.

DANIEL KUNKEL, OF OREGON, MISSOURI.

IMPROVEMENT IN BLACKSMITH'S TONGS.

Specification forming part of Letters Patent No. 153,001, dated July 14, 1874; application filed May 29, 1874.

*To all whom it may concern:*

Figure 1:
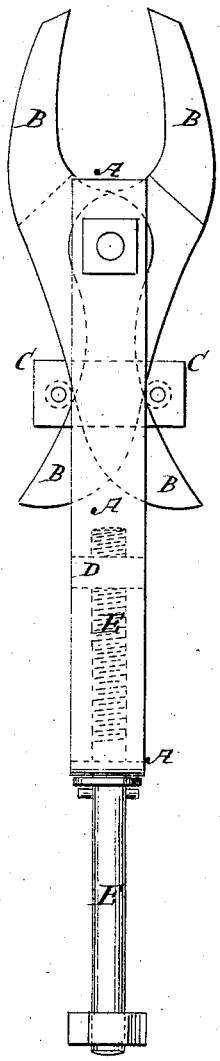
Figure 2:
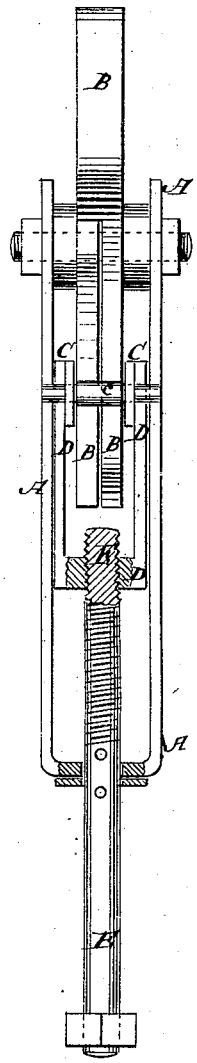
Figure 3:
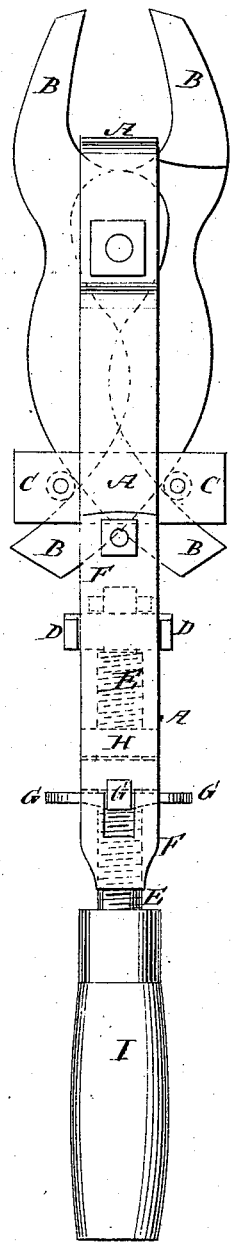
Figure 4:
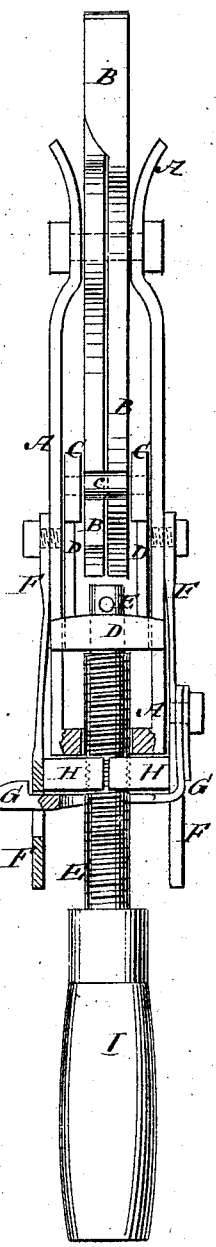

Be it known that I, DANIEL KUNKEL, of Oregon, in the county of Holt and State of Missouri, have invented a new and useful Improvement in Blacksmith's Tongs, &c., of which the following is a specification:

Figure 1 is a side view of my improved device, arranged as a drill-extractor simply. Fig. 2 is an edge view of the same, part being broken away to show the construction. Fig. 3 is a side view of the device, arranged for use as a blacksmith's tongs. Fig. 4 is an edge view of the same.

Similar letters of reference indicate corresponding parts.

My invention has for its object to furnish an improved instrument for use for a drill-extractor, a blacksmith's tongs, a vise, a wrench, and for various other uses, and which shall be simple in construction and convenient in use. The invention consists in the combination of the outer U-frame, the pivoted jaws made with curved shanks, the small cross-frame, the inner U-frame, and the swiveled screw-shaft; and in the combination of the springs, the spring-catch, and the half-nuts with the outer U-frame, the pivoted jaws made with curved shanks, the small cross-frame, the inner U-frame, and the swiveled screw-shaft, as hereinafter fully described.

A is a U-shaped bar or frame, to and between the ends of which are pivoted two jaws, B, which are halved to each other, or otherwise formed, so as to work squarely upon each other. The jaws B may be made of any desired shape, according to the particular use for which the instrument is intended. The shanks of the jaws B are curved, as shown in Figs. 1 and 3, and cross each other within the small cross-frame C, so that as the said frame C is moved up and down upon the said shanks the jaws B will be opened and closed. The cross-frame C is attached to and between the ends of the U-shaped bar or frame D, so as to be moved by and with the said frame D. The frame D is kept in line with the frame A, as it moves back and forth, by the projecting ends of the bars of the frame C, which rest against the edges of the frame A, or by flanges formed upon or attached to the bars or end of the frame D, and which rest against the edges of the said frame A. The frames C and D are moved out and in by the screw-shaft E, which is swiveled to the bend of the frame A, as shown in Fig. 2, or to the bend of the frame D, as shown in Fig. 4. In the first case the shaft E passes through a screw-hole formed in the bend of the frame D, and in the latter case it passes through a screw-hole in the bend of the frame A, or through a nut connected with the frame A. F are two springs, the inner ends of which are bolted or otherwise secured to the bars of the frame A. The outer ends of the springs F project beyond the end of the frame A, and to one of said ends is attached a spring, G, which is bent at right angles, has a hole formed through it for the passage of the shaft E, passes through a slot in the projecting end of the other spring, F, and has a shoulder or catch formed upon it to catch upon the said spring F. To the inner sides of the outer parts of the springs F, close to the bend of the frame A and between it and the spring-catch G, are attached two half-nuts, H, which, when the springs F are forced inward and held by the catch G, fit upon the screw-shaft E, so that the frames C D may be moved out and in by turning the said shaft E in one or the other direction. When the spring-catch G is drawn back to release the springs F the outward spring of the said springs F withdraws the half-nuts H from the shaft E, and allows the frames C D to be moved out and in to operate the jaws B instantly by moving the shaft out and in. The outer end of the shaft E has a screw-thread cut upon it to receive a handle, I, or a coupling to connect it with the rod or shaft, by which it is inserted in a drill-hole or other place and operated.

Having thus described my invention, I claim as new and desire to secure by Letters Patent—

1. The combination of the outer U-frame A, the pivoted jaws B made with curved shanks, the small cross-frame C, the inner U-frame D, and the swiveled screw-shaft E, substantially as herein shown and described.

2. The combination of the springs F, the spring-catch G, and the half-nuts H with the outer U-frame A, the pivoted jaws B made with curved shanks, the small cross-frame C, the inner U-frame D, and the swiveled screw-shaft E, substantially as herein shown and described.

DANIEL KUNKEL.

Witnesses:
W. B. DAVIS,
M. H. SOPER.